United States Patent Office

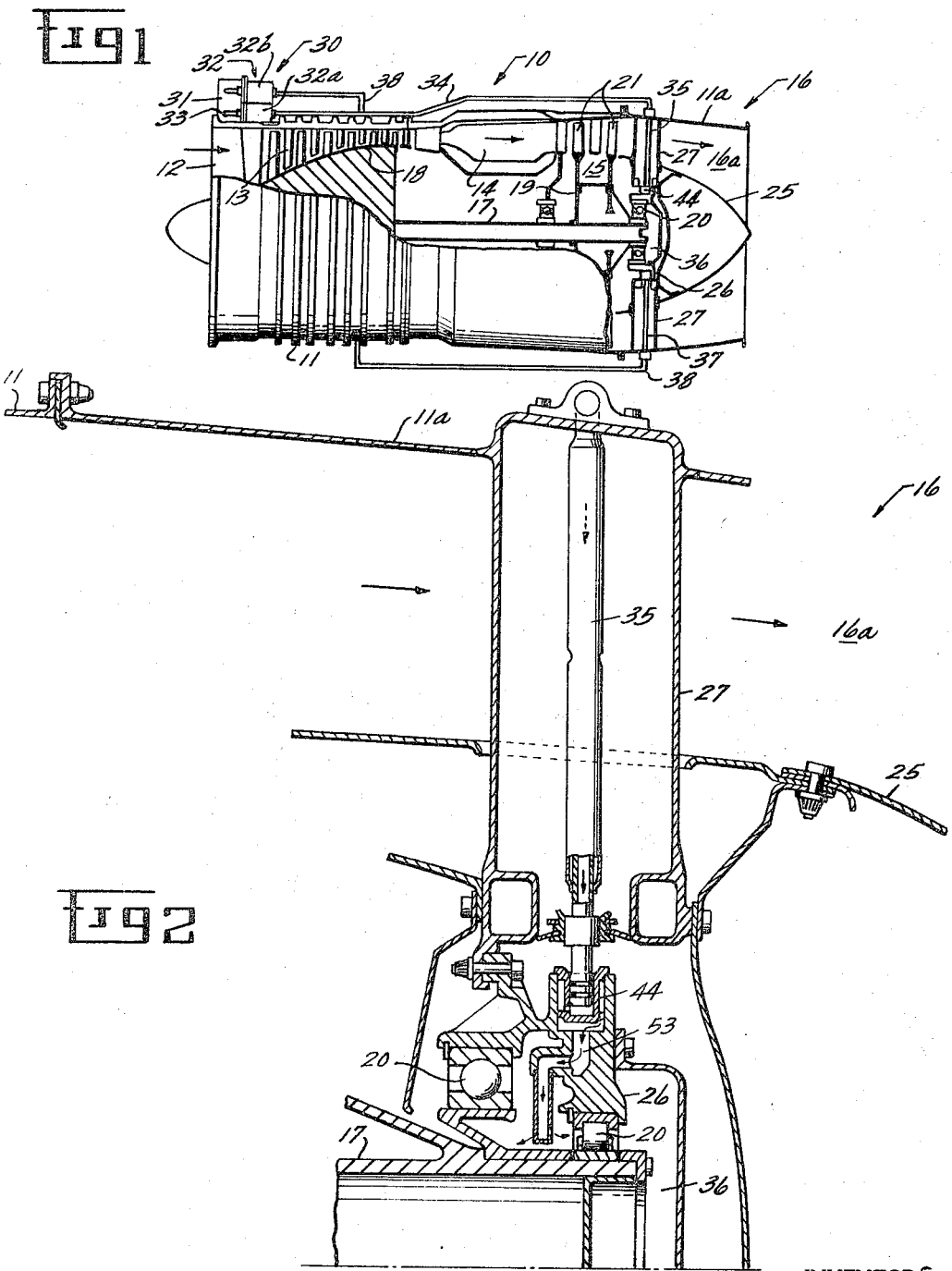

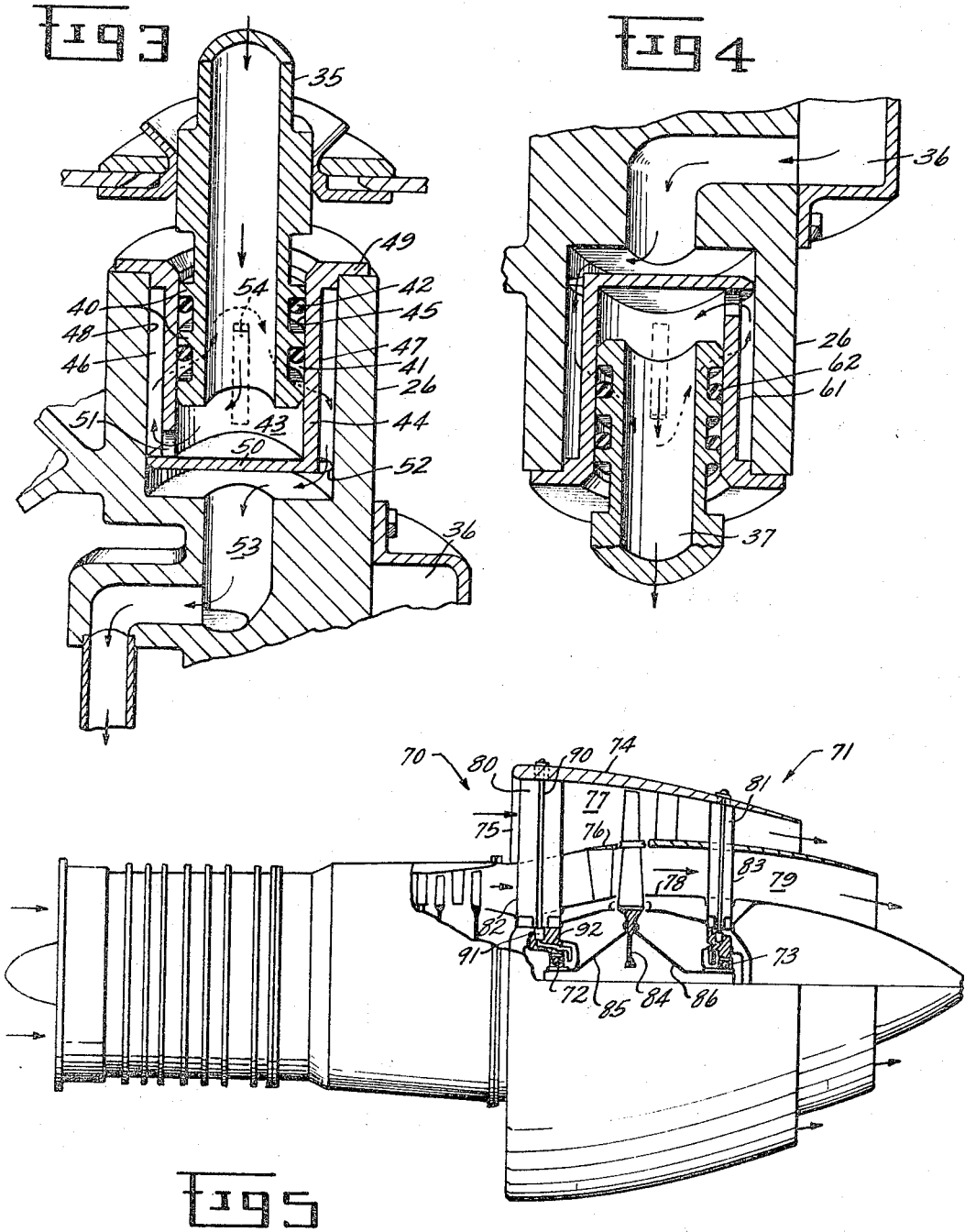

3,312,448
Patented Apr. 4, 1967

3,312,448
SEAL ARRANGEMENT FOR PREVENTING LEAKAGE OF LUBRICANT IN GAS TURBINE ENGINES
Thomas Neil Hull, Jr., Marblehead, and Brian Henry Rowe, Boxford, Mass., assignors to General Electric Company, a corporation of New York
Filed Mar. 1, 1965, Ser. No. 435,924
9 Claims. (Cl. 253—39)

This invention relates to lubrication means for high temperature turbomachines and, more particularly, to an insulated seal arrangement for preventing leakage of lubricant.

It is essential in gas turbine engines that the bearings supporting the engine rotor be adequately and continuously supplied with lubricant. In providing a suitable lubrication system, formidable temperature problems must be overcome. This is particularly true at the turbine end of the engine where the shaft bearings commonly operate at temperatures as high as 400° F. It is typical in such engines to supply the lubricant from the outer periphery of the engine to the bearings through radial conduits extending across the annular stream of combustion gases having temperatures as high as 1300° F. Even though it is common to provide substantial insulation for these conduits in order to maintain the temperature of the lubricant at a reasonably low level, the temperature gradients experienced during engine operation, particularly at start-up and shut-down, may be substantial. To prevent the creation of excessive thermal stresses and possible failure due to cracking or otherwise, the conduits are generally arranged so as to permit free expansion and contraction is response to temperature changes. More particularly, a typical approach to this problem is to provide slip fits between the radially inner ends of the radial conduits and cylindrical bushings or connecting means so that relative expansion and contraction can occur freely without loss of lubricant. Suitable seal means such as O-ring seals are provided to prevent leakage at the relatively movable joints. In practice, however, it has been found in some engines that conventional sealing materials are not able to withstand the normal operating temperatures for substantial periods of time without deteriorating to the point of permitting excessive leakage of lubricant. In some situations, it may not be desirable to replace these seals at such short intervals. Moreover, previously known solutions to this seal life problem, such as the use of unusual and expensive high temperature sealing materials and the use of bulky and heavy insulating materials for maintaining the seals at a sufficiently low temperature, may also be unattractive to the turbine designer.

It is therefore an object of this invention to provide in the lubrication system of a high temperature gas turbine engine an improved seal arrangement characterized by relatively long operating life of the seal arrangement characterized by relatively long operating life of the seal material.

Another object of this invention is to provide in a gas turbine engine a substantially stress free lubrication arrangement having improved seal means for preventing leakage of lubricant.

A further object is to provide in lubrication systems for gas turbine engines a seal arrangement in which relatively long seal life is attained without resorting to either unusual and expensive materials or bulky and heavy insulating arrangements.

A still further object is to provide in lubrication systems for gas turbine engines an improved seal arrangement in which the sealing material is maintained at a relatively low operating temperature.

In carrying out the invention in one form, the lubrication system for a gas turbine engine includes, at the turbine end of the engine, radial conduits extending across the annular stream of motive fluid for transmitting lubricant to and from the shaft bearing. The inner end of each conduit is slidably received in a cylindrical opening in a connector, seals being provided between the conduit and the connector to prevent leakage of lubricant. From the connector, a tortuous passageway connects the bearing and the cylindrical opening in the connector for the flow of lubricant. In accordance with the invention, the tortuous passageway substantially surrounds the connector and the seals therein such that the lubricant flowing in the tortuous passageway cools and insulates the seals from the high temperature stream of motive fluid. By a further aspect of the invention, the tortuous passageway is formed in part by the exterior surface of the connector and baffles are provided for assuring that the flowing lubricant is directed over substantially the entire exterior surface of the connector. In this manner, the operating temperature of the seals is held at a level compatible with satisfactory seal life.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a view, partially in cross-section, of a turbojet engine having the lubrication means of this invention;

FIG. 2 is a detailed view of the engine structure in the region of the rear shaft bearing illustrated by FIG. 1;

FIG. 3 is an exploded pictorial view of supply portions of the engine lubrication means illustrated by FIG. 2;

FIG. 4 is a view similar to FIG. 3 showing return portions of the lubrication system; and FIG. 5 is a view, partially in cross-section, of an aft-fan engine in which the lubrication means of this invention is utilized for lubricating the fan rotor bearings.

Referring first to FIG. 1, the lubrication means of this invention is illustrated in a gas turbine engine 10 of the turbojet type. The engine 10 has a cylindrical, segmented engine casing 11 enclosing in serial flow arrangement an inlet section 12, an axial flow compressor 13, an annular combustor 14, a gas generator turbine 15, and an exhaust section 16 through which high temperature products of combustion are discharged with high velocity to produce thrust. A rotor shaft 17 connects the drum rotor 18 of the compressor 13 to the rotor discs 19 of the turbine 15 to form a rigid rotor assembly, this integral rotor assembly being mounted for rotation by shaft bearings, the bearing 20 at the turbine or aft end of the engine 10 being illustrated by FIG. 1. The combustion products leaving the annular combustor 14 impinge on the turbine buckets 21 peripherally mounted on the rotor discs 19 to drive the entire rotor assembly at high speed.

With reference now being directed to FIGS. 1 and 2, the exhaust section 16 comprises an annular passageway 16a formed between a segment 11a of the segmented engine casing 11 and an inner substantially conical fairing 25, the conical fairing 25 and support structure 26 integrally formed therewith being supported from the casing 11 by a plurality of support struts 27 extending radially across the annular motive fluid passageway 16a. The aft bearing 20 is in turn carried by the support structure 26 and is lubricated by means of the lubrication system of the present invention. More particularly, a lubricant supply assembly 30 including a lubricant reservoir 31 and a pump 32 is mounted on the engine 10. The illustrated pump 32 is a multielement pump having at least two inlets and at least two outlets for performing separate pumping functions. The elements, which may be vane or gear type pump elements, are driven by the engine 10 through a gear train (not shown) or other suitable means. The element 32a is a supply pump which draws lubricant from the reservoir 31 through a tube 33 and discharges the lubricant under pressure into a supply tube 34 which is connected to a radial supply conduit 35 mounted within one of the support struts 27. The other element 32b is a scavenge pump which draws lubricant from the sump 36 associated with the bearing 20 through a radial conduit 37 located within another of the struts 27 and a return tube 38 connected therewith. From the pump element 32b, the scavenged lubricant is discharged into the reservoir 31. It will be appreciated that the other shaft bearings (not shown) are supplied with lubricant in a generally similar manner.

Turning attention now to FIGS. 2 and 3 and the supply portion of the lubrication system, the radial conduit 35 has at its inner end three circumferential teeth 40 forming therebetween a pair of annular channels 41 within which a pair of O-ring seals 42 are mounted, the O-ring seals 42 having outer diameters larger than both the diameter of the teeth 40 and the diameter of a cylindrical cavity 43 in a connector 44. In this manner, the seals 42 are compressed so as to prevent leakage of lubricant between the conduit and the interior wall 45 forming the radially disposed cavity 43 while permitting substantially unrestrained expansion and contraction in response to temperature changes. The connector 44 is received in a radially disposed cylindrical cavity in the support structure 26, the exterior surface 47 of the connector 44 being held in spaced relationship with the wall 48 forming the cavity by a flange 49 and a wall 50 which completely blocks the inner end of the cavity 43. An annular passageway 46 is thus formed about the connector 44, a port 51 in the connector 44 providing fluid communication between the cavity 43 and the passageway 46. Diametrically opposite the port 51 is a cut-away portion 52 of the wall 50 through which the passageway 46 is connected to a conduit 53 which directs lubricant to the bearing 20. Baffles 54 project from the exterior wall of the connector 44 into the passageway 46 to prevent direct flow of lubricant between the ports 51 and 52. In operation, flow of lubricant through the supply portion of the lubrication system is as illustrated by the arrows in FIGS. 2 and 3. As shown, the pressurized lubricant flows radially inwardly through the conduit 35, the shielding provided by the strut 27 preventing overheating of the lubricant as it traverses the motive fluid passageway 16a. From the conduit 35, the lubricant is discharged into the cavity 43 from which it enters the passageway 46 surrounding the connector 44 through the port 51. As the lubricant flows between the port 51 and the port 52, the baffles 54 direct it over substantially the entire extent of he exterior urface 47 of the connector 44. It will be noted that in this manner a tortuous fluid passageway is formed for the flow of lubricant. The O-ring seals 42 are shielded both externally and internally by relatively low temperature lubricant which both cools the connector 44 and the seals 42 and insulates the seals 42 from the high temperature motive fluid in the passageway 16a. As a result, the seals 42 have relatively long operating life since they are not overheated.

From the port 52, the lubricant flows through the conduit 53 to the bearing 20. After lubricating the bearing, the lubricant is collected in a sump 36 from which it is returned through the radial conduit 37. The radial conduit 37 is slidably received in a connector 61 as shown by FIG. 4, O-ring seals 62 preventing leakage. The flow pattern and seal insulating arrangement for the scavenge portion of the lubrication system are substantially as described with respect to the supply portion (with the fluid, of course, flowing in the opposite direction) and, therefore, not be discussed in detail at this point. It is believed that the arrangement and operation will be obvious from the above description taken in conjunction with the arrows of FIGS. 2–4.

The insulated seal arrangement of the present invention has been described and illustrated by FIGS. 1–4 in a gas turbine engine of the turbo-jet type. It will occur to those skilled in the art that the invention may be utilized in an equally advantageous manner in conjunction with the high temperature bearings of other turbomachines. As an example, attention is directed to FIG. 5 where the invention is utilized in the lubrication system for the fan rotor bearings 72 and 73 of an aft-fan engine 70. The fan assembly 71 is mounted axially downstream of the gas generator and comprises a power turbine and a fan in a single rotor assembly. As shown, the static structure of the fan assembly 71 includes a cylindrical outer casing or wall 74 which encloses the entire assemblage and provides an inlet 75 for bypass or secondary air, a cylindrical intermediate wall 76 divided into fore and aft sections and separating the bypass air passage 77 from the turbine exhaust gases, and a cylindrical inner wall 78 formed in two sections which defines the inner boundary of the turbine exhaust passage 79. The three walls are connected by radial struts 80 and 81 and by vanes 82 and 83 which serve as turbine nozzle and fan outlet guide vanes, respectively. The rotating structure of the fan assembly 71 comprises a single stage rotor which includes a rotor disc 84 connected to fore and aft stub shafts 85 and 86 supported in the bearings 72 and 73, respectively.

A lubrication supply conduit 90 extends radially across the passage 77 and the passage 79 containing high temperature motive fluid for supplying lubricant to the forward bearing 72. To shield the flowing lubricant from the hot gases in the passage 79, the conduit 90 is mounted within radially aligned ones of the struts 80 and the turbine nozzle vanes 82. In view of the normal operating temperature and the need for relatively free thermal expansion and contraction, the inner end of the conduit 90 is slidably received in a connector 91 from which the lubricant is supplied through a conduit 92 to the bearing 72. While not illustrated in detail, it will be understood that the connector 91 is substantially identical to the connector 44 described above and that its seals are protected in precisely the same manner from the high temperature gases in the motive fluid passage 79. Also, while not described in detail, it will be understood that the lubrication system for the aft bearing 73 is substantially identical to the arrangement for the forward bearing 72.

It will thus be seen that the insulated seal arrangement of this invention protects the seal materials from the high motive fluid temperatures existing in the exhaust portion of a gas turbine engine. By maintaining relatively low operating temperatures, relatively long seal life is attained without resorting to either unusual and expensive materials or bulky and heavy insulating arrangements.

It will be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and is desired to obtain by Letters Patent of the United States is:

1. In a gas turbine engine assembly:
   support structure,
   bearing means carried by said support structure for supporting an engine rotor for rotation,
   a conduit for the flow of lubricant,
   connecting means carried by said support structure for slidably receiving said conduit,
   seal means between said conduit and said connecting means for preventing leakage of lubricant,
   and means forming a passageway between said connecting means and said bearing means for the flow of lubricant, said passageway surrounding said connecting means and said seal means.

2. In a gas turbine engine assembly:

means forming a passageway for the flow of motive fluid, support structure located inwardly of said passageway, bearing means carried by said support structure for supporting an engine rotor for rotation, a conduit for the flow of lubricant, connecting means carried by said support structure, said connecting means having an exterior surface and a substantially cylindrical interior surface for slidably receiving said conduit, seal means between said conduit and said interior surface for preventing leakage of lubricant, and means forming a tortuous passageway between the interior of said connecting means and said bearing means for the flow of lubricant, said tortuous passageway being formed in part by the exterior surface of said connecting means.

3. In a gas turbine engine assembly:

means forming an axially extending annular passageway for the flow of high temperature motive fluid, support structure located inwardly of said passageway, bearing means carried by said support structure for supporting an engine rotor for rotation, a conduit for the flow of lubricant extending radially across said passageway, connecting means carried by said support structure, said connecting means having an exterior surface and an interior surface forming a radially disposed cylinder for slidably receiving the inner end of said conduit, seal means between said conduit and said interior surface for preventing leakage of lubricant, and means forming a tortuous passageway between said radially disposed cylinder and said bearing means for the flow of lubricant, said tortuous passageway being formed in part by the exterior surface of said connecting means such that lubricant flowing in said conduit and in said tortuous passageway substantially surrounds said seal means to insulate said seal means from high temperature motive fluid in said annular passageway.

4. Lubrication means as defined by claim 3 in which baffle means are provided in said tortuous passageway for directing lubricant in said tortuous passageway over substantially the entire exterior surface of said connecting means.

5. In gas turbine engine assembly:

means forming an axially extending annular passageway for the flow of high temperature motive fluid, support structure located inwardly of said passageway, at least one hollow strut extending radially across said passageway to hold said support structure in position, bearing means carried by said support structure for supporting an engine rotor for rotation, a conduit for the flow of lubricant coaxially mounted within said strut and extending radially across said passageway, connecting means at the radially inner end of said conduit, said connecting means having an exterior surface forming a radially disposed cylinder for slidably receiving the inner end of said conduit, seal means between said conduit and said interior surface for preventing leakage of lubricant, means surrounding said connecting means to form with the exterior surface of said connecting means an annular cavity, porting means between the radially inner end of the cylinder formed by the interior surface of said connecting means and said cavity, fluid communication means between said cavity and said bearing means for the flow of lubricant, and baffle means in said cavity for directing lubricant therein over substantially the entire exterior surface of said connecting means so as to insulate said seal means from high temperature motive fluid in said annular passageway.

6. Lubrication means as defined by claim 5 in which said sealing means is comprised of at least one O-ring circumferentially surrounding said conduit.

7. In a fan type gas turbine engine assembly:

means forming coaxial inner and outer annular passageways for the flow of high temperature motive fluid and bypass fluid, support structure located inwardly of said passageways, bearing means carried by said support structure for supporting an engine rotor for rotation, a conduit for the flow of lubricant extending across said passageways, connecting means carried by said support structure for slidably receiving said conduit, seal means between said conduit and said connecting means for preventing leakage of lubricant, and means forming a passageway between said connecting means and said bearing means for the flow of lubricant, said passageway surrounding said connecting means and said seal means.

8. In a fan type gas turbine engine assembly:

means forming coaxial inner and outer annular passageways, said inner passageway being for the flow of high temperature motive fluid and said outer passageway being for the flow of bypass fluid, support structure located inwardly of said passageways, bearing means carried by said support structure for supporting an engine rotor for rotation, a conduit for the flow of lubricant extending radially across said passageways, connecting means carried by said support structure, said connecting means having an exterior surface and an interior surface forming a radially disposed cylinder for slidably receiving the inner end of said conduit, seal means between said conduit and said interior surface for preventing leakage of lubricant, and means forming a tortuous passageway between said radially disposed cylinder and said bearing means for the flow of lubricant, said tortuous passageway being formed in part by the exterior surface of said connecting means such that the lubricant flowing in said conduit and in said tortuous passageway substantially surrounds said seal means to insulate and seal means from high temperature motive fluid in said inner annular passageway.

9. In a fan type gas turbine engine assembly:

means forming coaxial inner and outer annular passageways, said inner passageway being for the flow of high temperature motive fluid and said outer passageway being for the flow of bypass fluid, support structure located inwardly of said passageways, at least one hollow strut extending radially across said passageways to hold said support structure in position, bearing means carried by said support structure for supporting an engine rotor for rotation, a conduit for the flow of lubricant coaxially mounted within said strut and extending radially across said passageways, connecting means at the radially inner end of said conduit, said connecting means having an exterior surface and an interior surface forming a radially disposed cylinder for slidably receiving the inner end of said conduit, seal means between said conduit and said interior surface for preventing leakage of lubricant, means surrounding said connecting means to form with the exterior surface of said connecting means an annular cavity, porting means between the radially inner end of the cylinder formed by the interior surface of said connecting means and said cavity, fluid communication means between said cavity and said bearing means for the flow of lubricant, and baffle means in said cavity for directing lubricant therein over substantially the entire exterior surface of said connecting means so as to insulate said seal means from high temperature motive fluid in said inner annular passageway.

No references cited.

MARTIN P. SCHWADRON, *Primary Examiner.*

EVERETTE A. POWELL, JR., *Assistant Examiner.*

UNITED STATES PATENT OFFICE
CERTIFICATE OF CORRECTION

Patent No. 3,312,448                                    April 4, 1967

Thomas Neil Hull, Jr., et al.

It is hereby certified that error appears in the above numbered patent requiring correction and that the said Letters Patent should read as corrected below.

Column 1, line 56, strike out "of the seal arrangement characterized by relatively long operating life"; line 34, for "is" read -- in --; column 3, line 53, for "he" read -- the --; same line 53, for "urface" read -- surface --; line 72, before "there-" insert -- will --.

Signed and sealed this 21st day of November 1967.

(SEAL)
Attest:

Edward M. Fletcher, Jr.
Attesting Officer

EDWARD J. BRENNER
Commissioner of Patents